United States Patent [19]
Yatsu

[11] Patent Number: 6,002,544
[45] Date of Patent: Dec. 14, 1999

[54] HEAD POSITIONING CONTROL SYSTEM FOR USE IN A DISK DRIVE USING DIFFERENT TARGET VELOCITY DATA FOR READ AND WRITE SEEKS

[75] Inventor: Masahide Yatsu, Tokyo, Japan

[73] Assignee: Kabushiki Kaisha Toshiba, Kawasaki, Japan

[21] Appl. No.: 08/918,319

[22] Filed: Aug. 26, 1997

[30] Foreign Application Priority Data

Dec. 27, 1996 [JP] Japan ................................. 8-349755

[51] Int. Cl.$^6$ ............................................. G11B 5/55
[52] U.S. Cl. ............................. 360/78.09; 360/78.04
[58] Field of Search ................................. 360/78.07, 75, 360/78.04, 78.06

[56] References Cited

U.S. PATENT DOCUMENTS

| | | | |
|---|---|---|---|
| 5,150,266 | 9/1992 | Albert | 360/78.07 X |
| 5,754,358 | 5/1998 | Yatsu | 360/78.09 |
| 5,859,742 | 1/1999 | Takaishi | 360/78.01 |

FOREIGN PATENT DOCUMENTS 5-258487  10/1993  Japan .

OTHER PUBLICATIONS

"Magnetic Disk Device," Patent Abstracts of Japan, Abstract only of JP5–258487, Oct. 8, 1993.

*Primary Examiner*—Aristotelis M. Psitos
*Assistant Examiner*—James L Habermehl
*Attorney, Agent, or Firm*—Limbach & Limbach LLP; Ronald L. Yin

[57] ABSTRACT

A head positioning control system for use in a HDD and arranged to position a head in a target position has different seek control systems arranged to be operated respectively when a read access is made and when a write access is made. When the read access is made, the system using target velocity data for controlling read seek executes read seek control. When the write access is made, the system using target velocity data for controlling write seek executes write seek control. The read seek control allows the head to be moved to the target position at relatively high velocity. The write seek control allows the head to relatively stably and accurately reach the target position.

8 Claims, 7 Drawing Sheets

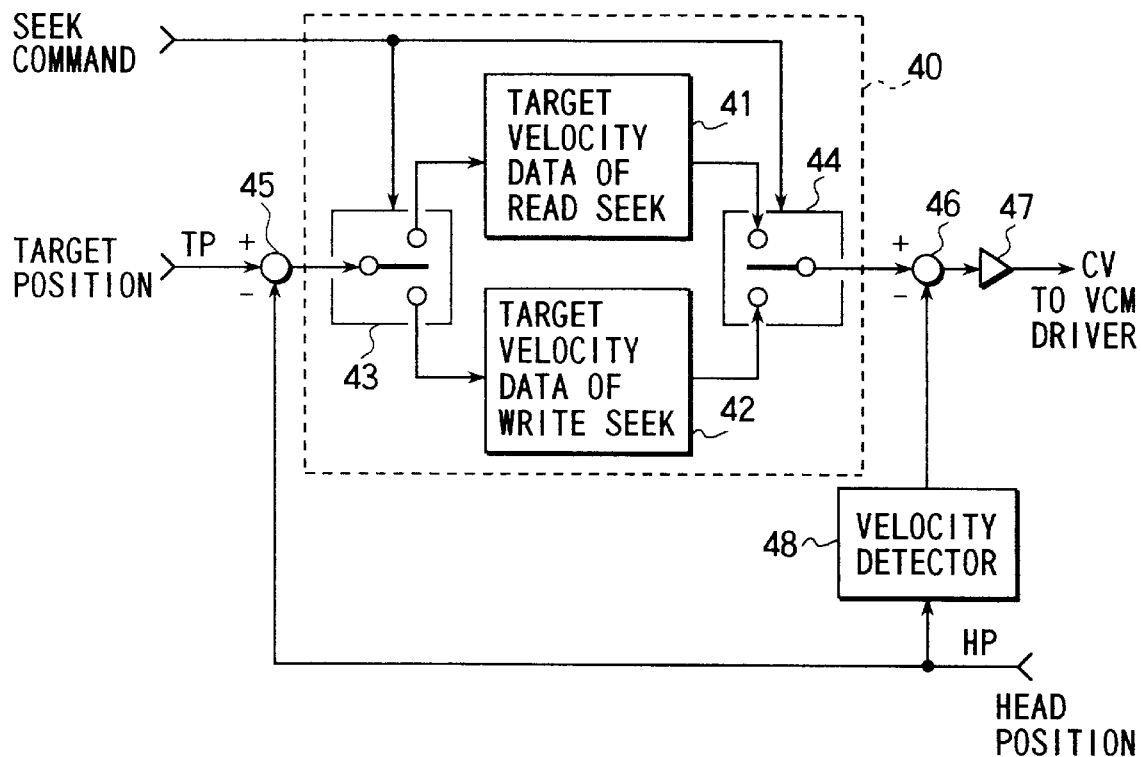
F I G. 1
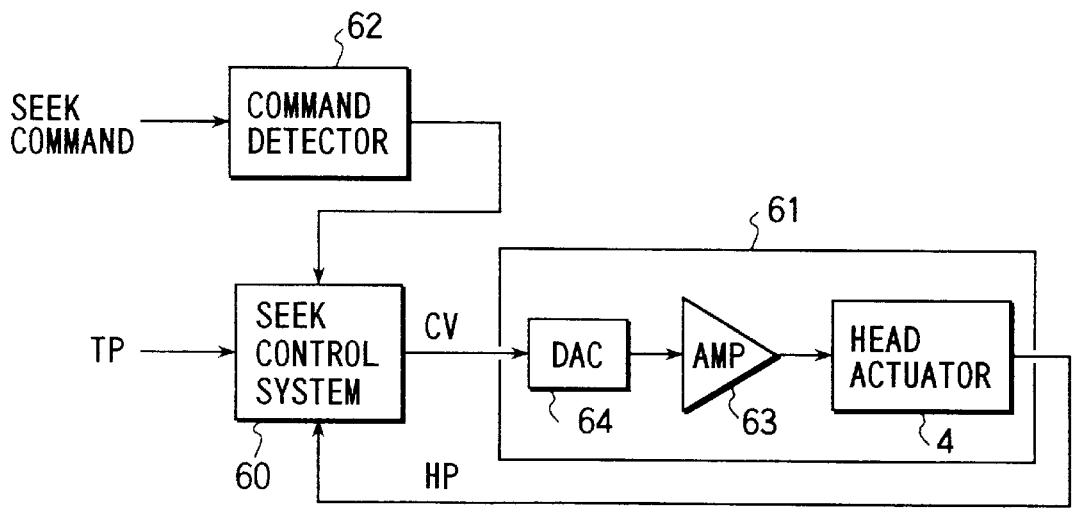
F I G. 2

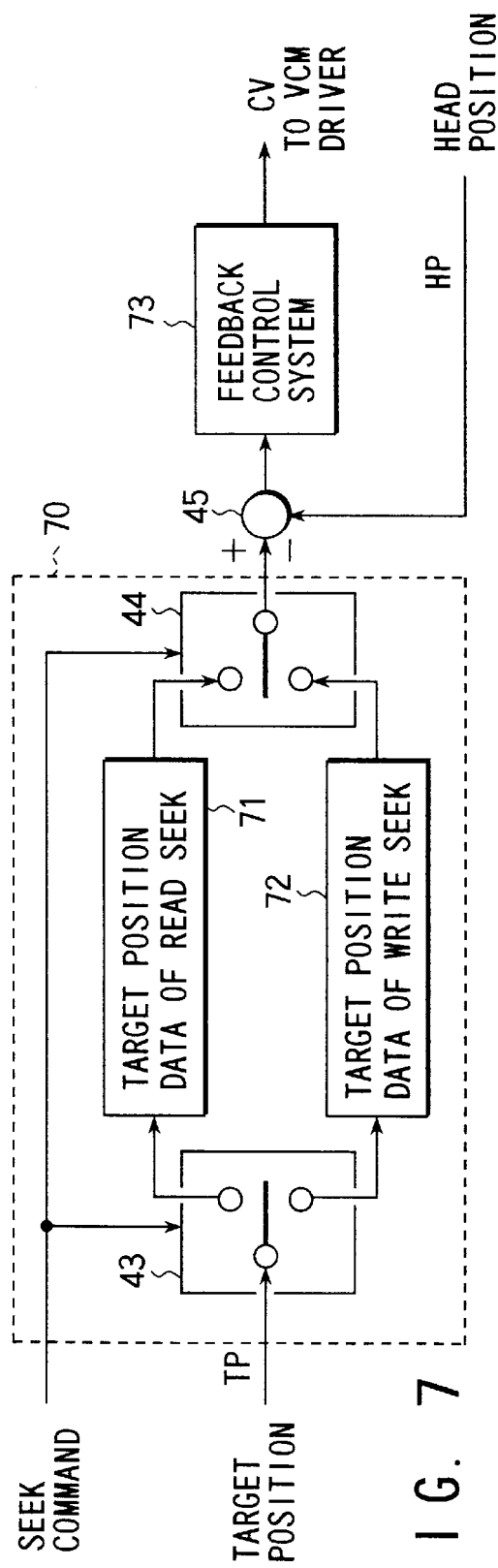
F I G. 7
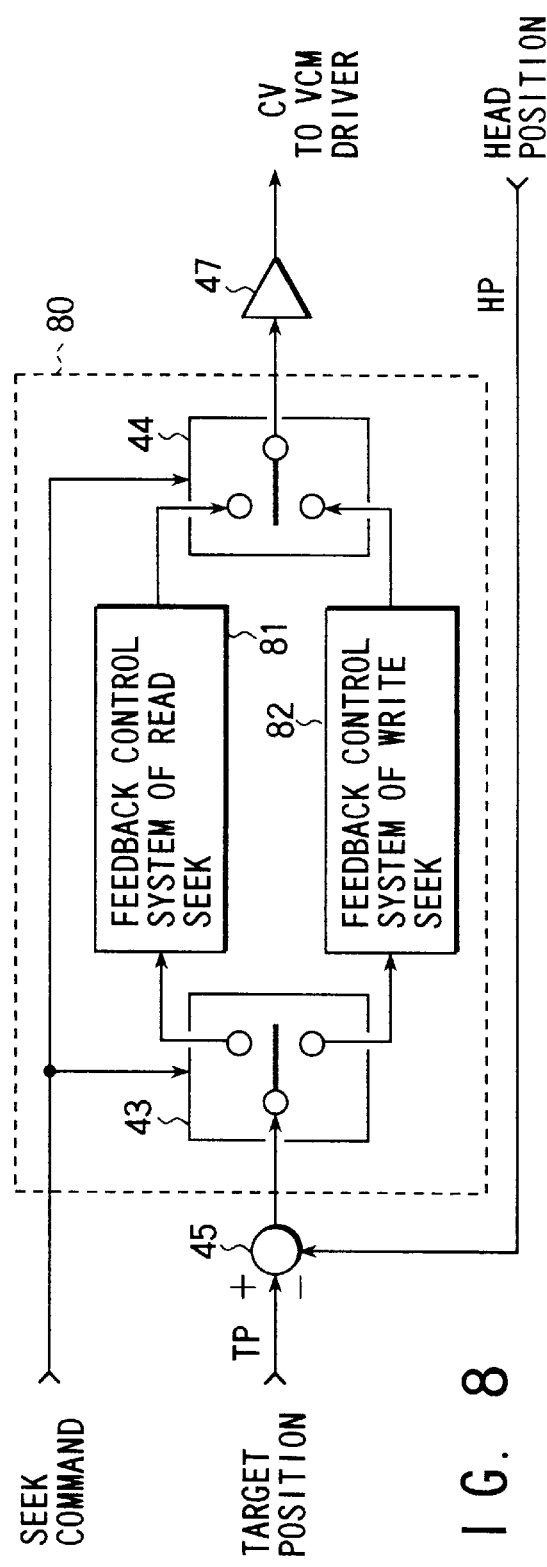
F I G. 8

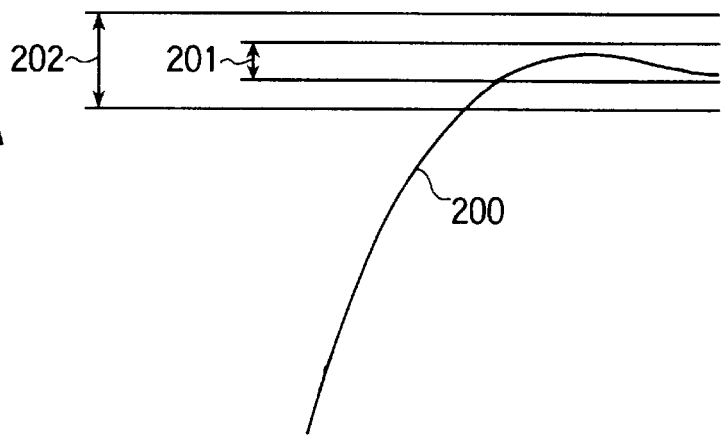
FIG. 10A
PRIOR ART
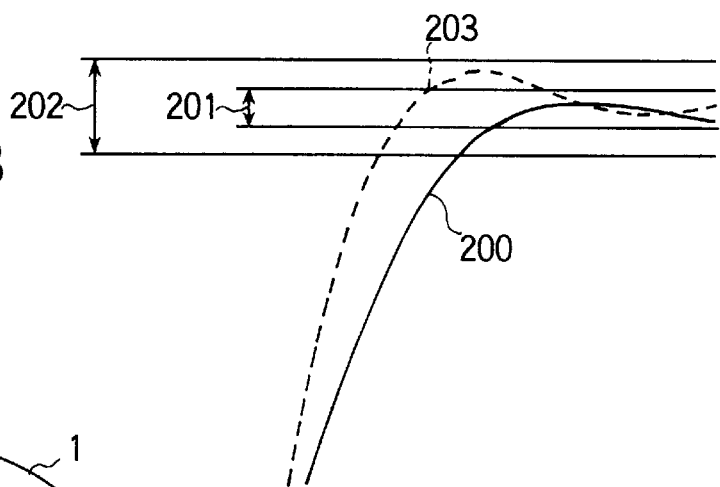
FIG. 10B
PRIOR ART
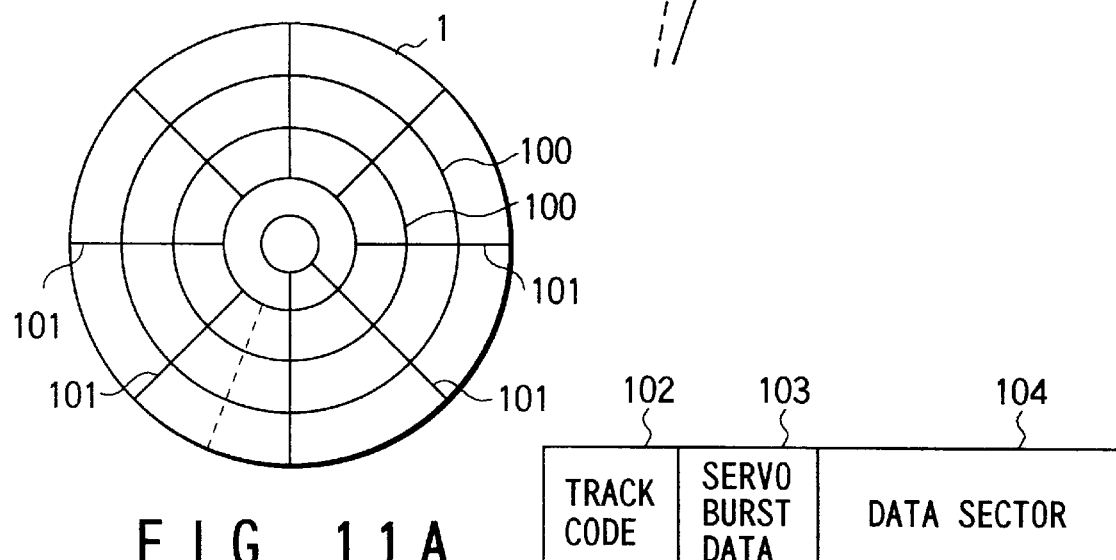
FIG. 11A
PRIOR ART
FIG. 11B
PRIOR ART

HEAD POSITIONING CONTROL SYSTEM FOR USE IN A DISK DRIVE USING DIFFERENT TARGET VELOCITY DATA FOR READ AND WRITE SEEKS

BACKGROUND OF THE INVENTION

The present invention relates to a head positioning control system for use in, for example, a hard disk drive to control positioning of a head in a target position in accordance with servo data which has previously been recorded on the disk.

A disk storage system, for example, a hard disk drive (HDD) comprises a head for writing data on a disk (a storage medium) and reading data from the disk. To perform the operation for reading or writing data, a head positioning control system for controlling positioning of the head in a target position (a storage region to which an access will be made) on the disk is required.

Specifically, the target position is a specific track (a specific cylinder) on the disk of the HDD, the track (the cylinder) including a data sector to which a read access (an operation for reading data) or a write access (an operation for writing data) is made.

A HDD, as shown in FIG. 11A, has a multiplicity of tracks 100 formed concentrically on the data side of a disk 1 thereof. Servo areas 101 having servo data recorded thereon are formed at the same directional positions of the tracks 100. The servo areas 101 are formed in the circumferential direction of the disk 1 while being apart from each other at predetermined intervals. The servo area 101, as shown in FIG. 11B, is a sector (a servo sector) serving as a reference position for a plurality (for example, 50) of data sectors 104 included in one track 100. The servo area 101 has servo data mainly composed of a track code 102 and servo burst data 103 recorded thereon (when the HDD has been manufactured).

Servo data is used in an operation for controlling positioning of the head by the head positioning control system. That is, servo data is position data with which the position of the head is detected. The track code 102 is a gray code for indicating serial numbers called track addresses (or cylinder addresses) for identifying the tracks 100. The servo burst data 103 is a burst signal pattern with which a position in a range of each track 100 is detected.

When a target position on the disk, to which an access will be made, has been determined, the head positioning control system performs seek control (also called "velocity control") and track following control. The seek control is a controlling operation for moving the head to a position near a target position, the seek control being performed in accordance with a target velocity corresponding to the distance from the current position of the head to the target position. The head positioning control system detects the position of the head in accordance with the above-mentioned track code 102 read by the head to calculate the distance from the position of the head to the target position in order to determine the target velocity. Moreover, the system calculates the movement velocity in accordance with the detected position of the head so as to output an amount of a control operation (a digital value) determined in accordance with the difference between the movement velocity and the target velocity. Specifically, the amount of the control operation is a quantity for operating a head actuator for moving the head. That is, the amount of the control operation is the level of an electric current for rotating a voice coil motor (VCM) of the head actuator. The system forms a feedback control system for performing control until the target position and the current position of the head coincide with each other.

The track following control is a control operation for allowing the head to coincide with the target position. Specifically, the track following control is position control for positioning the head in a range of the target track. The system forms a feedback control system for detecting the position of the head in accordance with servo burst data 103 read from the head to perform a control operation until the position of the head and the target position coincide with each other.

When the head positioning control system has performed seek control, the head moves on a locus in the form of a curve shown in FIG. 9A. In FIG. 9A, an axis of abscissa stands for seek time which is taken for the head when a read access or a write access is made and axis of ordinate stands for positions of the head from the current position to a target position (TP). When the seek control is performed, the system outputs the amount CV of the control operation as shown in FIG. 9C.

When the seek control is performed, the head is moved in accordance with its movement velocity characteristic, as shown in FIG. 9B, composed of an acceleration mode (Ma) in an initial period, a constant velocity mode (Mc) in which maximum velocity is maintained and a final deceleration mode (Mr) after the head has approached a target position. The system is shifted from the deceleration mode (Mr) to a next operation for performing the track following control. As described above, the system executes the seek control in accordance with the target velocity. The target velocity is previously stored in a memory as target velocity data. That is, target velocity data is information in the form of a table for indicating the velocity with which the above-mentioned velocity characteristics composed of the acceleration mode (Ma), the constant speed mode (Mc) and the deceleration mode (Mr) can be obtained in accordance with the distance for which the head moves.

The seek control has been performed in such a manner that the amount CV of the control operation is adjusted in the deceleration mode in order to shorten the period of time required for the head to move to the target position. That is, as shown in FIG. 9C, the system outputs maximum amount CV of the control operation in the acceleration mode (Ma) and reduces the amount CV of the control operation in the deceleration mode (Mr) so as to adjust the amount CV of the control operation. To shorten the time required for the head to move to the target position, the head movement velocity is rapidly changed in the deceleration mode (Mr). However, the HDD encounters phenomenon called "overshoot" and "undershoot" with respect to the target position if the head is, adjacent to the target position, rapidly decelerated because of an error of its mechanical system or dispersion in the characteristics of the circuit system occurring owning to the tolerance in the manufacturing process. As a result, the head is caused to considerably deviate from the target position. Therefore, even if the time required for the head to move to a position near the target position is shortened, time (time to perform the track following control) required for the head to be made coincide with an allowable range in which data can be written or an allowable range in which data can be read is elongated undesirably. Thus, the read seek time (time for which the head performs seeking when a read access is made) and the write seek time (time for which the head performs seeking when a write access is made) are elongated.

If the system rapidly changes the head movement velocity in the deceleration mode during the seek control operation, the probability of occurrence of the overshoot phenomenon, which is a phenomenon for the head to pass the target position, and the undershoot phenomenon, with which the head cannot reach the target position, is increased. Accordingly, excessive deviation of the head from the allowable range in which data can be written or the allowable range in which data can be read is prevented by moderately setting the decelerating locus on which the head is moved in the deceleration mode. That is, stabilization for accurately moving the head to a position near the target position is given priority to shortening the seek time for the head.

The head must be positioned in a target position at different accuracy level between the read access and the write access. That is, as shown in FIG. 10A, an allowable range 201, into which the head must be positioned when the write access is made, is determined to be narrower than an allowable range 202 into which the head must be positioned when the read access is made if the range (the range for the target track) for the target position is the same. FIG. 10A shows a movement locus 200 for the head when the write seek control is performed. If the head reaches the range of the adjacent track when the head writes data on the range of the target track to perform a data writing operation by making a write access, the possibility of breakage of data recorded on the adjacent track is enlarged. Therefore, the allowable range 201 into which the head must be positioned is required to be relatively narrow when the write access is made. That is, positioning control more accurate than that required in the read access operation must be performed.

However, the conventional head positioning control system has been arranged to perform the seek control with the same velocity characteristic in both of the cases where the read access is made and the write access is made. That is, the feedback control system for the seek control has been designed by using the accuracy as a reference which is required when the write access (the operation for writing data) is made in which the allowable range into which the head must be positioned is narrow. Therefore, when the read access is made in which a wide allowable range 202 is permitted, the head moves on a movement locus 203 with remainder capacity as compared with the performance of the system for positioning the head, as shown in FIG. 10B. When the read access is made, the allowable accuracy range 202 for the head is relatively wide. Therefore, the performance of the system may be used to shorten the head seek time as compared with the positioning accuracy. Since the accuracy allowable range 201 for positioning the head is relatively narrow when the write access is performed, the performance of the system must be used to improve the positioning accuracy.

BRIEF SUMMARY OF THE INVENTION

An object of the present invention is to provide a head positioning control system for use in a HDD or the like which is capable of realizing head positioning control to be adaptable to a write access and a read access so that the head is accurately positioned when an operation for writing data is performed and read seek time taken when an operation for reading data is performed is shortened.

To achieve the object, according to one aspect of the present invention, there is provided a head positioning control system for positioning a head in a target position on a disk based on a servo data prerecorded on the disk, the system comprising: read seek control means for controlling and moving the head to the target position in accordance with prerecorded target velocity data for the read seek when a read access is made; and write seek control means for controlling and moving the head to the target position in accordance with prerecorded target velocity data for the write seek when a write access is made.

Specifically, the read seek control means executes velocity control when an operation for reading data is performed in which a relatively wide allowable range is permitted for the head in such a manner that a deceleration locus in the deceleration mode velocity characteristic for the seek control is made to be somewhat sharp in accordance with target velocity data for controlling the read seek. As a result, seek time taken for the head to be moved to a target position can be shortened when a read access is performed. The write seek control means executes velocity control when an operation for writing data is performed in which a relatively narrow allowable range is permitted to position the head in such a manner that the deceleration locus in the deceleration mode of the velocity characteristic for the seek control is made to be moderate in accordance with target velocity data for controlling the write seek. As a result, when the head is moved to a target position for making an access to write data, a movement locus for the head can be realized such that the head is accurately positioned in an allowable positioning range.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an essential portion of a head positioning control system according to the present invention;

FIG. 2 is a block diagram showing a portion including the head positioning control system according to the present invention;

FIG. 7 is a block diagram showing a first modification of the present invention;

FIG. 8 is block diagram showing a second modification of the present invention;

FIGS. 10A and 10B are diagrams showing allowable range for positioning the head when the read access is performed and when the write access is performed;

FIG. 11A is a diagram showing a format of a track on the disk of a HDD; and

FIG. 11B is a diagram showing a servo area on the disk.

DETAILED DESCRIPTION OF THE INVENTION

An embodiment of the present invention will now be described with reference to the drawings.

Structure of Hard Disk Drive

A head positioning control system according to the present invention, as shown in FIG. 1, is a feedback control system for executing seek control (velocity control). In this embodiment, an assumption is made that the system according to the present invention is applied to a hard disk drive (HDD).

Figure 4:
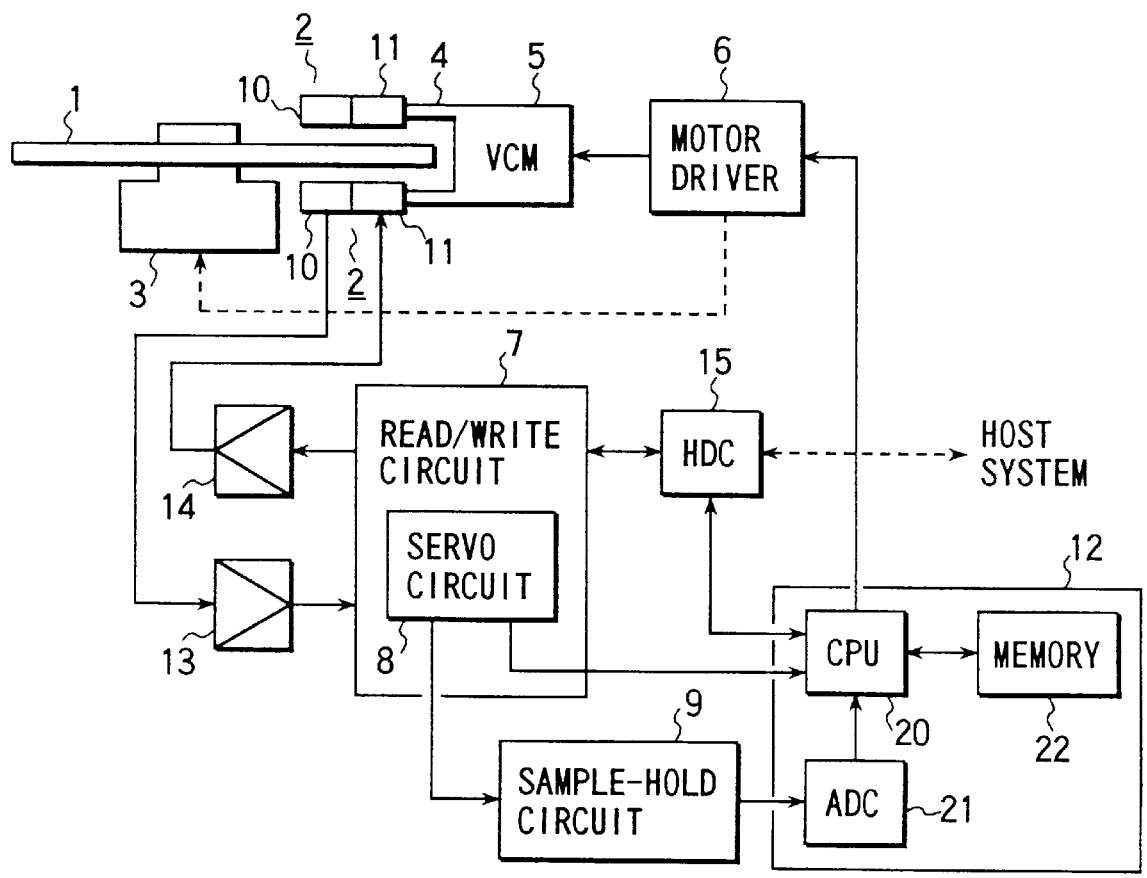
FIG. 4 is a block diagram showing an essential portion of a disk drive for use in the present invention.

The HDD, as shown in FIG. 4, has a mechanism comprising a spindle motor 3 for securing a disk 1 and rotating the same at high speed; a head 2 mounted on a head actuator 4; and a voice coil motor (VCM) 5 for operating the head actuator 4.

One or more (one in this embodiment for convenience) disks 1 are provided for the HDD. The disk 1 has a multiplicity of tracks concentrically formed thereon. Each track has servo areas formed at predetermined intervals, the servo areas having servo data previously recorded thereon (see FIG. 11A).

The head 2 comprises a read head 10, which is a MR (magnetoresistive) head, and a write head 11 which is an inductive head. The heads 10 and 11 are mounted on the same slider in such a manner that they are located apart from each other. The head 2 is disposed to correspond to the two sides of the disk 1. The head actuator 4 is rotated by the VCM 5 to move the head 2 in the radial direction of the disk 1. The VCM 5 is supplied with a drive electric current from a motor driver 6 including a VCM driver. The motor driver 6 includes a driver for rotating the spindle motor 3.

Moreover, the HDD has a control system for operating and controlling the above-mentioned mechanism and a signal processing system for processing signals for reading/writing data. The signal processing system comprises a head amplifier and a read/write circuit 7. The head amplifier comprises a read amplifier 13 for amplifying a read signal supplied from the read head 10 and a write amplifier 14 for supplying a write signal (a write electric current) to the write head 11.

The read/write circuit 7 usually comprises an exclusive integrated circuit for executing an operation for processing signals for writing/reading data. That is, the read/write circuit 7 encodes write data transmitted from the disk controller (HDC) 15 to transmit encoded write data to the write amplifier 14. The read/write circuit 7 receives the read signal supplied from the read amplifier 13 to perform decoding to original write data so as to transmit write data to the HDC 15. The HDC 15 has an interface between the HDD and the host system (a computer) to control transference of read data and write data.

The control system includes a head positioning control system according to the present invention and comprises a servo circuit 8, a sample hold circuit 9 and a microcontroller 12. The servo circuit 8 is included in the read/write circuit 7 in a usual structure. The servo circuit 8 extracts servo data from the read signal reproduced by the read/write circuit 7. As described above, servo data is composed of a track code and servo burst data (see FIG. 11B). The track code is a gray code indicating serial numbers called track addresses (or cylinder addresses) for identifying the tracks. Servo burst data is a servo burst signal pattern for detecting a portion in each of the tracks. The servo circuit 8 transmits a track code to a microcontroller 12 and servo burst data (the amplitude of each of burst signal patterns A to D) to a sample hold circuit 9. The sample hold circuit 9 holds each of the amplitudes of servo burst data to transmit the amplitudes to the microcontroller 12.

The microcontroller 12 is a main control unit for the HDD, the microcontroller 12 comprising a microprocessor (CPU) 20, an A/D converter 21 and a memory 22. The head positioning control system according to the present invention comprises the CPU 20 of the microcontroller 12 as the main unit thereof and realized by firmware which is executed by the CPU 20.

The A/D converter 21 receives the amplitude of servo burst data held by the sample hold circuit 9 to convert the amplitude into a digital value so as to transmit the digital value to the CPU 20. In accordance with the digital value (data about the position of the head 2) supplied from the A/D converter 21, the CPU 20 executes the above-mentioned track following control. Specifically, the CPU 20 uses the digital value to calculate a position error between a target position (the center of the track) in the range of the target track and the position of the head to supply, to the motor driver 6, an amount of a control operation for amending the position error.

In accordance with the track code supplied from the servo circuit 8, the CPU 20 executes the seek control according to the present invention. The CPU 20 transmits a required amount of the control operation to perform the seek control. The motor driver 6 includes a D/A converter to convert the digital value supplied from the CPU 20 into an analog voltage signal so as to supply the signal to the VCM driver. The VCM 5 is supplied with a drive current determined in accordance with the amount of the control operation calculated by the CPU 20. The memory 22 previously stores the firmware for the CPU 20 and target velocity data according to the present invention. The target velocity data according to the present invention is, as will be described later, classified into target velocity data for controlling the read seek and target velocity data for controlling the write seek.

Head Positioning Control System

The head positioning control system according to the present invention, as shown in FIG. 1, is a seek control system having a feedback control structure for moving the head 2 to a target position TP (a target track including a data sector to which an access will be made) on the disk 1. A main element 40 of the head positioning control system transmits either target velocity data 41 for controlling the read seek or target velocity data 42 for controlling the write seek. That is, the main element 40 has switch elements 43 and 44 for performing a switching operation to follow a seek command. Target velocity data 41 and 42 is information in the form of a table stored in the memory 22 and is data for determining a velocity value corresponding to the distance for which the head must be moved. As described later, the velocity value has velocity characteristics consisting of an acceleration mode (Ma), a constant speed mode (Mc) and a deceleration mode (Mr)(see FIG. 5B).

The switch elements 43 and 44 switch input/output of target velocity data 41 and 42 to follow the seek command indicating the read seek (the read access) or the write seek (the write access). That is, when the seek command is the read seek, the switch elements 43 and 44 select target velocity data 41 for controlling the read seek. A velocity value corresponding to the movement distance transmitted from a position difference element 45 is retrieved so as to be transmitted to the velocity difference element 46 by the switch element 44. When the seek command is the write seek, the switch elements 43 and 44 select target velocity data 42 for controlling the write seek. A velocity value corresponding to the movement distance transmitted from the position difference element 45 is retrieved so as to be transmitted to the velocity difference element 46 by the switch element 44.

The position difference element 45 calculates a position error between the target position TP (the target track) and the actual head position HP (the track address at which the head is located), that is, the distance for which the head 2 must be moved. As described above, the head position HP is detected in accordance with the track code read from the servo area of the disk 1 by the head 2. Therefore, the distance for which the head 2 is moved corresponds to the number of tracks (the number of cylinders) through which the head 2 passes.

The velocity difference element 46 calculates the difference between target velocity transmitted from the main element 40 and the head movement velocity detected by the velocity detection element 48. The system transmits a value obtained by multiplying the calculated difference in the velocity by a predetermined gain to the VCM driver included in the motor driver 6, the value being transmitted as amount CV (a digital value) of the control operation.

Figure 3:
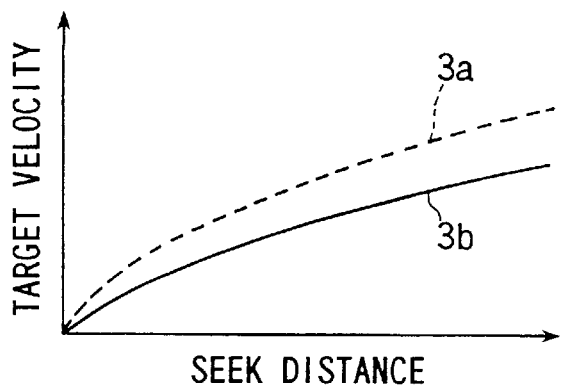
FIG. 3 is a graph showing target velocity data for use in the present invention.

In the present invention, target velocity data 41 for controlling the read seek and target velocity data 42 for controlling the write seek are determined to have different velocity characteristic patterns. That is, as shown in FIG. 3, a velocity characteristic 3a for controlling the read seek is set in such a manner that an average target velocity with respect to the seek distance (the movement distance) is higher than the velocity characteristic 3b for controlling the write seek. The velocity characteristic is determined in such a manner that target velocity data 41 is set to have a relatively sharp deceleration locus 51a in the deceleration mode (Mr) (see FIG. 5B). On the other hand, target velocity data 42 is determined to have a relatively moderate deceleration locus 51b in the deceleration mode (Mr) for controlling the write seek.

A seek control system 60 shown in FIG. 1 transmits the amount CV (a digital value) of the control operation to the VCM driver which is a control subject 61, as shown in FIG. 2. The seek control system 60 receives position data (a track code) HP of the head 2 mounted on the head actuator 4 included in the control subject 61. The seek control system 60 receives a read seek command or a write seek command, which is a result of an operation performed by a command decoder 62 for decoding the seek command.

The VCM driver, which is the control subject 61, has a D/A converter 64 for converting the amount CV of the control operation, which is the digital value, into an analog voltage signal; and an amplifier 63 for converting the voltage signal obtained by conversion performed by the D/A converter 64. A described above, the head actuator 4 is operated by the VCM 5.

The command decoder 62 is an element included in the CPU 20. The CPU 20 decodes the read/write access command set from the host system into a register of the HDC 15 so as to determine whether the command is the read seek command or the write seek command.

Seek Control Operation

Mainly referring to FIGS. 5A to 5C and a flow chart shown in FIG. 6, the seek control operation according to the present invention will now be described.

An assumption is made that the system shown in FIG. 1 is operated by the CPU 20 of the HDD shown in FIG. 4 in the description which will now be described.

In accordance with an access command issued from the host system, the CPU 20 determines whether the command is the read seek command or the write seek command (steps S1 and S2). An assumption is made here that the command is the write seek command ("NO" in step S3). The CPU 20 determines a target track which is the target position TP to which the head 2 (the write head 11) must be moved in accordance with a logical address which is included in the access command and to which the write access must be made.

Then, the CPU 20 selects and retrieves target velocity data with which the head 2 is moved to the target position TP by retrieving target velocity data 42 for controlling the write seek stored in the memory 22 (step S5). That is, the switching element 43 selects target velocity data 42 for controlling the write seek, as shown in FIG. 1.

In accordance with the track code (transmitted from the servo circuit 8) read by the head 2 (the read head 10), the CPU 20 detects the current head position (track address) TP so as to calculate the movement distance to the target position TP (refer to the element 45 shown in FIG. 1). The CPU 20 retrieves target velocity corresponding to the calculated movement distance from target velocity data 42 for controlling the write seek (refer to the element 46 shown in FIG. 1). In accordance with the calculated difference in the velocity, the CPU 20 calculates the amount CV of the control operation so as to transmit it to the VCM driver included in the motor driver 6.

As a result of the above-mentioned write seek control, the head 2 is seek-controlled to a position near the target track on the disk 1 (step S6). As described above, target velocity data 42 for controlling the write seek has the relatively low velocity characteristic, as shown in FIG. 3. Moreover, target velocity data 42 is, as shown in FIG. 5B, set to have the relatively moderate deceleration locus 51b in the deceleration mode (Mr) (refer to a change pattern 52b of the amount CV of the control operation shown in FIG. 5C).

Figure 5A:
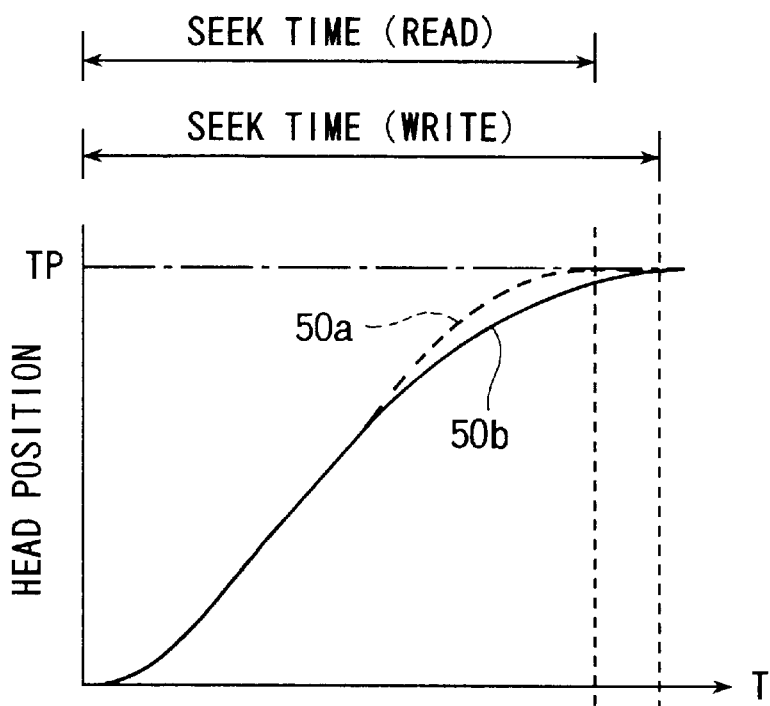
FIG. 5A is a graph showing a movement locus for the head when seek control is performed in the operation according to the present invention.
Figure 5B:
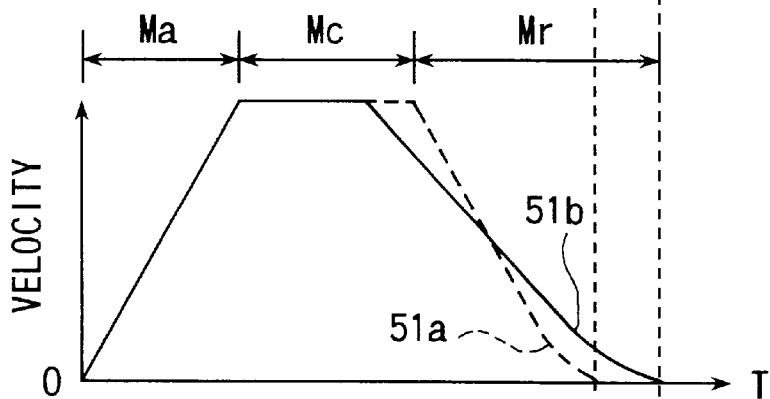
FIG. 5B is a graph showing a movement velocity characteristic of the head when the seek control is performed in the present invention.
Figure 5C:
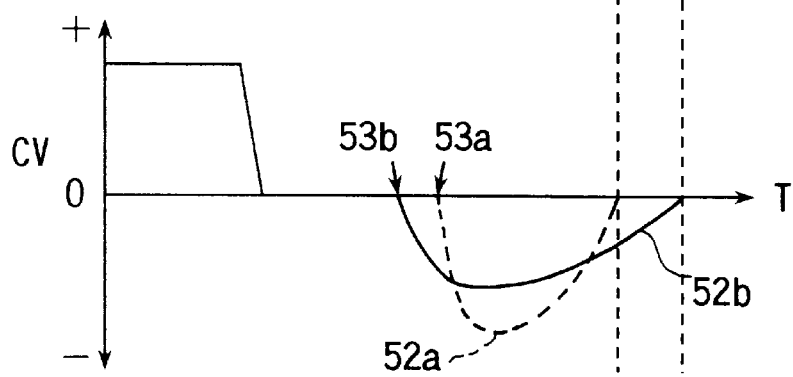
FIG. 5C is a graph showing change in the amount of a control operation of the system when the seek control is performed in the present invention.
Figure 6:
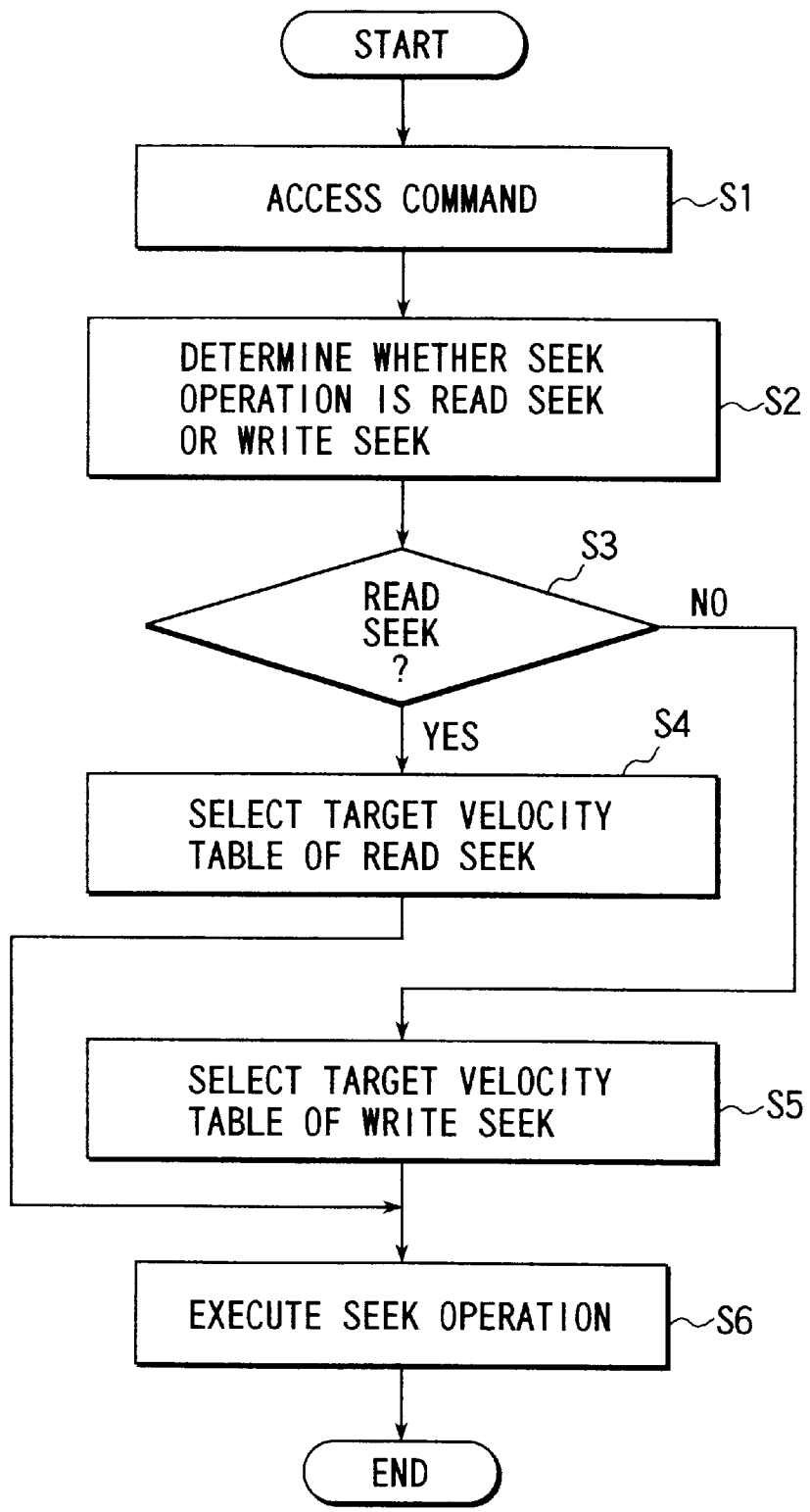
FIG. 6 is a flow chart of a seek control operation according to the present invention.
Figure 9A:
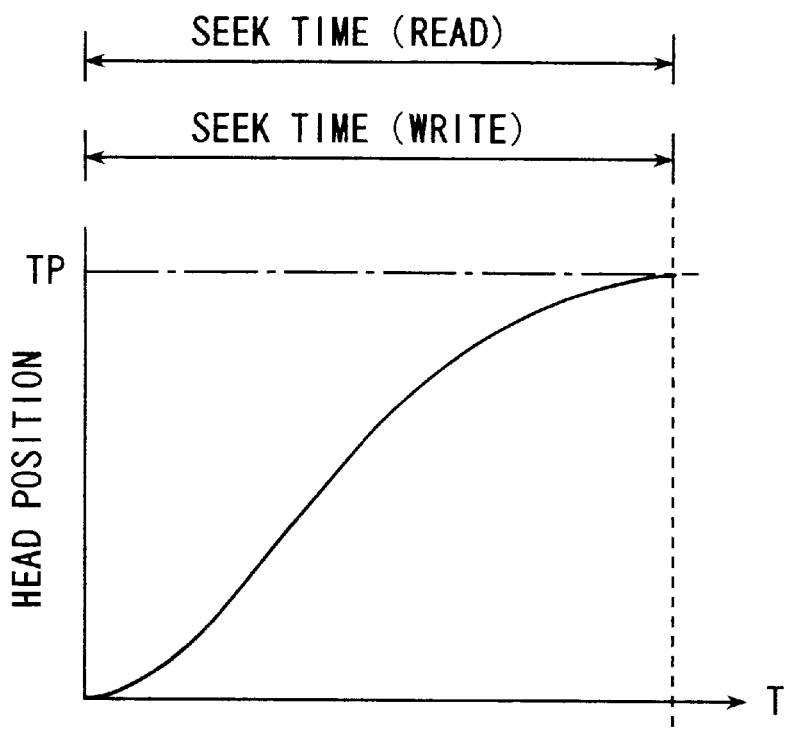
FIG. 9A is a graph showing a movement locus of the head when seek control is performed.
Figure 9B:
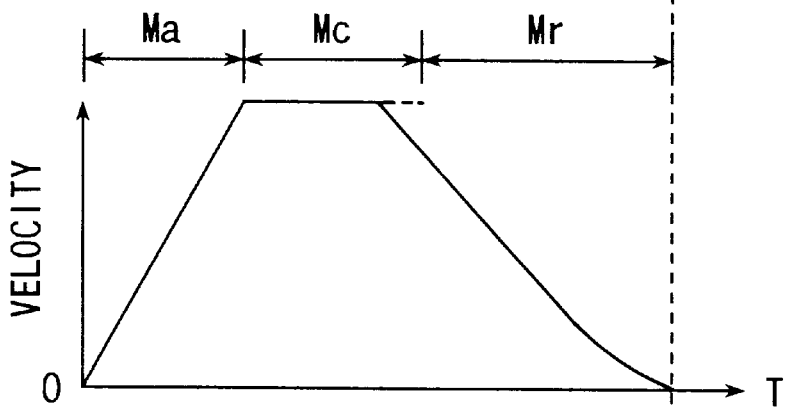
FIG. 9B is a graph showing a movement velocity characteristic of the head when the seek control is performed.
Figure 9C:
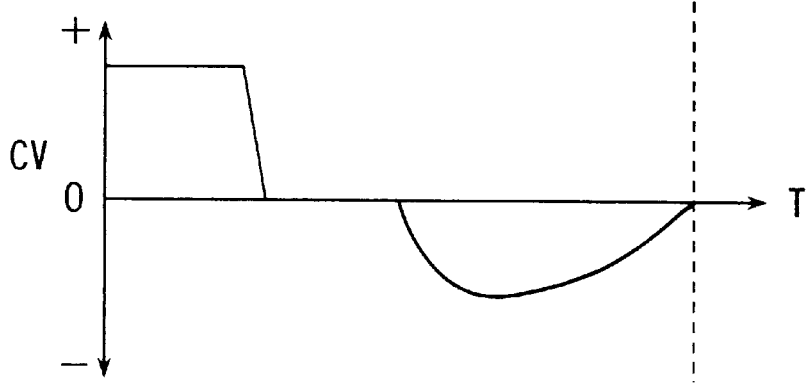
FIG. 9C is a graph showing change in the amount of a control operation of the system when seek control is performed.

Therefore, the write seek control according to the present invention is performed in such a manner that the seek time taken for the head 2 to reach the target position TP (or a position near the target position TP) is relatively long, as shown in FIG. 5A. In the deceleration mode (Mr) in which the head 2 approaches the target position TP, the head 2 is moved on the relatively moderate deceleration locus 51b. Therefore, the head 2 reaches the target position TP with a relatively precise accuracy. As described above, allowable positioning range for the target position TP is determined to be relatively narrow for performing the operation for writing data by making the write access (see FIGS. 10A and 10B). The reason for this is that data recorded on an adjacent track must be protected from being magnetically broken owning to overshoot (or undershoot) in which the head is excessively deviated from a target track.

In fine, target velocity data 42 for controlling the write seek is determined in such a manner that the target velocity pattern is inclined moderately to enable the moving speed of the head 2 to easily follow and the movement velocity of the head 2 to moderately be decelerated in the deceleration mode (after the head 2 has approached the target position). Therefore, although the seek time taken for the head 2 to reach the target position is relatively long when the write access is made, the head 2 can be positioned in an allowable range of the target position with a precise accuracy. As shown in FIG. 5C, velocity control is performed in such a manner that deceleration start time 53b for the write seek control is relatively earlier than deceleration start time 53a for the read seek control so that a stable moving characteristic is obtained.

When the command is the read seek command, the CPU 20 causes the head 2 to be moved to target track TP including a data sector which is the subject to which an access will be made to read data by the read head 10 ("YES" in step S3).

Then, the CPU 20 selects and retrieves target velocity data with which the head 2 is moved to the target position TP by retrieving target velocity data 41 for controlling the read seek stored in the memory 22 (step S4). That is, the switching element 43 selects target velocity data 41 for controlling the read seek, as shown in FIG. 1. An operation similar to the operation which is performed when the write seek control is carried out. That is, the CPU 20 detects the current head position (the track address) HP in accordance with the track code read by the read head 10 so as to calculate the movement distance to the target position TP. Then, the CPU 20 retrieves target velocity corresponding to the calculated movement distance from target velocity data 41 for controlling the read seek. Then, the CPU 20 calculates the difference between the obtained target velocity and the movement velocity of the head 2. In accordance with the calculated difference in the velocity, the CPU 20 calculates the amount CV of the control operation to transmit the amount CV of the control operation to the VCM driver included in the motor driver 6.

As a result of the above-mentioned read seek control, the head 2 is seek-controlled to a position near the target track on the disk 1 (step S6). As described above, target velocity data 41 for controlling the read seek, as shown in FIG. 3, has a relatively high velocity characteristic. Moreover, a relatively sharp deceleration locus 51a is drawn in the deceleration mode (Mr), as shown in FIG. 5B (refer to the change pattern 52a of the amount CV of the control operation shown in FIG. 5C).

Therefore, the read seek control according to the present invention is able to relatively shorten the seek time taken for the head 2 to reach the target position TP (or a position near the target position TP), as shown in FIG. 5A. In the deceleration mode (Mr) in which the head 2 approaches the target position TP, the relatively sharp deceleration locus 51a is drawn. Therefore, the head 2 reaches the target position TP at relatively high velocity.

When the operation for reading data is performed by making a read access, the allowable positioning range for the target position TP is relatively wide as described above (refer to FIGS. 10A and 10B). In short, target velocity data 41 for controlling the read seek has the high velocity characteristic. Moreover, the movement velocity of the head 2 has the sharp deceleration characteristic in the deceleration mode (when the head 2 has approached the target position). Therefore, when the read access is made, the seek time for the head 2 to reach the target position is relatively shortened. Thus, the movement velocity of the disk 1 can be raised. Although the operation for positioning the head 2 in the target position is made to be slightly instable as compared with that in the read seek control, no problem arises because a relatively wide allowable positioning range for the target position is provided (see FIG. 10B). Moreover, the velocity control is, as shown in FIG. 5C, performed in such a manner that the deceleration start time 53a in the read seek control is made to be relatively late as compared with the deceleration start time 53b in the read seek control so as to obtain a high velocity characteristic.

As described above, target velocity data 42 for controlling the write seek when the write access is made and target velocity data 41 for controlling read seek when the read access is made are provided. Thus, the seek control (the velocity control) is performed in accordance with the different velocity characteristics. Since the above-mentioned seek control is performed, a stable movement of the head 2 to the target position with a precise accuracy can be realized when the operation for writing data is performed in the state where the allowable positioning range for the target position is set to be a narrow range. When the data reading operation is performed in which a relatively wide allowable positioning range is permitted, a high speed operation can be performed in such a manner that the head 2 can be moved to the target position in a short time.

First Modification

FIG. 7 shows a track following control system (a position control system) according to a first modification. That is, the track following control system is a control system for positioning the head 2 in a range of the target track after the head 2 has been moved to a position near the target position (the target track).

The track following control system according to the present invention is a position control system having a double-degree-of-freedom and comprising, as a main element 70, target position data 71 indicating a target position locus for use in the read seek operation and target position data 72 indicating a target position locus for use in the read seek operation. Target position data items 71 and 72 are information items in the form of a table indicating a target position locus pattern corresponding to target position TP, the target position data 71 and 72 being previously stored in the memory 22.

In the system, the position difference element 45 calculates a position error between the target position locus supplied from the main element 70 and the head position HP to transmit the position error to a feedback control system 73. The feedback control system 73 transmits amount CV of the control operation capable of amending the position error to the VCM driver (the motor driver 6). The head position HP is detected in accordance with servo burst data included in servo data recorded on the servo area on the disk 1.

When the seek command is the write seek command, the system causes the switching element 43 to select target position data 72 so as to transmit a target position locus pattern adaptable to the write access to the position difference element 45. The position difference element 45 calculates a position error between a target position locus pattern and the head position HP to transmit the position error to the feedback control system 73. The feedback control system 73 transmits amount CV of the control operation for positioning the head 2 in a target position.

As described above, a relatively narrow allowable positioning range for the target position is permitted for the data writing operation which is performed by making a write access. Accordingly, target position data 72 for the write access has a target position locus pattern which enables the head 2 to stably follow the range. Therefore, the head 2 can be positioned in the relatively narrow allowable positioning range with a precise accuracy when the operation for writing data is performed. That is, a stable positioning operation can be performed in such a manner that excessive overshoot or undershoot from a target position can be prevented.

If the seek command is the read seek command, the system causes the switching element 43 to select target position data 71 so as to transmit a target position locus pattern adaptable to the read access to the position difference element 45. Similarly, the position difference element 45 calculates a position error between the target position locus pattern and the head position HP so as to transmit the position error to the feedback control system 73. The feedback control system 73 transmits amount CV of the control operation for positioning the head 2 to a target position.

When the operation for reading data is performing by making a read access, the relatively wide allowable positioning range is permitted for the target position. Accordingly, target position data 71 for the read access has a target position locus pattern for positioning the head 2 in a target position in a relatively short time. Therefore, although the positioning operation becomes slightly instable when the operation for reading data is performed, the head 2 can be positioned in a relatively wide allowable positioning range at high velocity.

Second Modification

FIG. 8 shows a track following control system (a position control system) according to a second modification and corresponding to a single-degree-of-freedom. The system according to this modification is formed basically similarly to the position control system according to the first modification and having the double-degree-of-freedom. However, the system according to this modification has, as a main element 80, feedback control systems 81 and 82 having different feedback control characteristics.

Specifically, when the seek command is, for example, the write seek command, the system causes the switching element 43 to select the feedback control system 82 for the write seek. The position difference element 45 calculates a position error between target position TP and head position HP as described above. The feedback control system 82 transmits, to the VCM driver, amount CV of the control operation for amending the position error (transmitted from the position difference element 45) from the target position TP after the amplifier 47 multiplies the amount CV of the control operation by a predetermined gain. As described above, a relatively narrow allowable positioning range is permitted for a target position when the operation for writing data is performed by making a write access. The feedback control system 82 has a feedback control characteristic for enabling the head 2 to stably follow the range. Therefore, when the operation for writing data is performed, the head 2 can be positioned in the relatively narrow allowable positioning range with a precise accuracy. That is, a stable positioning operation can be performed in such a manner that excessive overshoot or undershoot from a target position is prevented.

If the seek command is the read seek command, the system causes the switching element 43 to select the feedback control system 81 for the read seek. Similarly, the feedback control system 81 transmits, to the VCM driver, amount CV of the control operation for amending a position error (transmitted from the position difference element 45) from target position TP after the amplifier 47 multiplies the amount CV of the control operation with a predetermined gain.

A relatively wide allowable positioning range is permitted for a target position for the operation for reading data by making a read access. Accordingly, the feedback control system 81 for the read seek has target position data 71 for the read access provided with a feedback characteristic for positioning the head 2 in a target position in a relatively short time. Therefore, although the positioning operation is made to be slightly instable when the operation for reading data is performed, the head 2 can be positioned in a target position in a relatively wide allowable positioning range at high velocity.

As described above, according to the present invention, the head can be positioned in a target position with a relatively precise accuracy when the write access is performed if the present invention is applied to a head positioning control system for a HDD. Therefore, an undesirable fact that the operation for writing data is performed in such a manner that data is erroneously written on a track adjacent to a target track and thus data is broken can be prevented. When the head is positioned in a target position for making an access for reading data, the head can be positioned at relatively high velocity. In fine, positioning control is executed to be suitable for each of the operation for writing data and the operation for reading data. As a result, data can reliably be written and the read seek time can be shortened.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A head positioning control system for positioning a head in a target position on a disk based on a servo data prerecorded on the disk, the system comprising:

read seek control means for controlling and moving the head to the target position in accordance with prerecorded target velocity data for the read seek when a read access is made;

write seek control means for controlling and moving the head to the target position in accordance with prerecorded target velocity data for the write seek when a write access is made; and write seek control means uses target velocity data for controlling the write seek having a precise accuracy characteristic to execute seek control in such a manner that the head is moved to a relatively narrow allowable range for the target position as compared with an allowable range for use when the read access is made on the assumption that the movement distance to the target position is the same.

2. A head positioning control system for positioning a head in a target position on a disk based on a servo data prerecorded on the disk, the system comprising:

read seek control means for controlling and moving the head to the target position in accordance with prerecorded target velocity data for the read seek when a read access is made;

write seek control means for controlling and moving the head to the target position in accordance with prerecorded target velocity data for the write seek when a write access is made; and target velocity data for controlling the read seek and target velocity data for controlling the write seek have the velocity characteristics for controlling movement of the head, the velocity characteristics including the same target velocity for use in an acceleration mode and a constant velocity mode and different target velocity for use in a deceleration mode which is employed when the head has approached a target position.

3. A head positioning control system for positioning a head in a target position on a disk based on a servo data prerecorded on the disk, the system comprising:

read seek control means for controlling and moving the head to the target position in accordance with prerecorded target velocity data for the read seek when a read access is made;

write seek control means for controlling and moving the head to the target position in accordance with prerecorded target velocity data for the write seek when a write access is made;

read seek control means includes means for executing read position control which uses target position locus data having a high velocity characteristic to position the head in the allowable range for the target position after the head has approached the target position; and the write seek control means includes means for executing write position control which uses target position locus data having a precise accuracy characteristic to position the head in a relatively narrow allowable range for the target position as compared with an allowable range for use when the read access is made.

4. A head positioning control system for positioning a head in a target position on a disk based on a servo data prerecorded on the disk, the system comprising:

read seek control means for controlling and moving the head to the target position in accordance with prerecorded target velocity data for the read seek when a read access is made;

write seek control means for controlling and moving the head to the target position in accordance with prerecorded target velocity data for the write seek when a write access is made;

each of target velocity data items for respectively controlling the read seek and the write seek has a velocity characteristic composed of an acceleration mode, a constant speed mode and a deceleration mode; and target velocity data for controlling the write seek is arranged in such a such a manner that start time of the deceleration mode is earlier than start time of the deceleration mode indicated by target velocity data for controlling the read seek.

5. In a disk drive having a head, a disk and a head positioning control system for positioning the head in a target position on the disk based on a servo data prerecorded on the disk, the head positioning control system comprising:

determining means for determining read seek control for moving the head to the target position when a read access is made to read data by the head from the target position on the disk or write seek control for moving the head to the target position when a write access is made to write data on the target position;

detecting means for detecting the position of the head in accordance with servo data read by the head;

memory means for previously storing target velocity data for controlling the read seek and target velocity data for controlling the write seek;

means for selectively reading target velocity data for controlling the read seek from the memory means when the read seek control is performed and for selectively reading target velocity data for controlling the write seek from the memory means when the write seek control is performed;

read seek control means for executing the read seek control by transmitting an amount of a control operation corresponding to the difference in the velocity between velocity indicated by target velocity data for controlling the read seek selected from the memory means and movement velocity obtained in accordance with the position of the head detected by the detecting means;

write seek control means for executing the write seek control by transmitting an amount of a control operation corresponding to the difference in the velocity between velocity indicated with target velocity data for controlling the write seek selected from the memory means and movement velocity obtained in accordance with the position of the head detected by the detecting means;

driving means for moving the head to the target position at the velocity determined in accordance with the amount of the control operation transmitted from the read seek control means or the write seek control means;

memory means stores target velocity data having a high velocity characteristic as compared with target velocity data for controlling the write seek to use as target velocity data for controlling the read seek and stores target velocity data having a precise accuracy characteristic as compared with target velocity data for controlling the read seek to use as target velocity data for controlling the write seek;

the read seek control means uses target velocity data for controlling the read seek to execute seek control in such a manner that seek time taken for the head to be moved to the target position is relatively short as compared with time taken when the write seek control is performed; and the write seek control means uses target velocity data for controlling the write seek to execute the seek control in such a manner that the head is moved to a relatively narrow allowable range for the target position as compared with an allowable range for use when the read seek control is performed.

6. In a disk drive having a head, a disk and a head positioning control system for positioning the head in a target position on the disk based on a servo data prerecorded on the disk, the head positioning control system comprising:

determining means for determining read seek control for moving the head to the target position when a read access is made to read data by the head from the target position on the disk or write seek control for moving the head to the target position when a write access is made to write data on the target position;

detecting means for detecting the position of the head in accordance with servo data read by the head;

memory means for previously storing target velocity data for controlling the read seek and target velocity data for controlling the write seek;

means for selectively reading target velocity data for controlling the read seek from the memory means when the read seek control is performed and for selectively reading target velocity data for controlling the write seek from the memory means when the write seek control is performed;

read seek control means for executing the read seek control by transmitting an amount of a control operation corresponding to the difference in the velocity between velocity indicated by target velocity data for controlling the read seek selected from the memory means and movement velocity obtained in accordance with the position of the head detected by the detecting means;

write seek control means for executing the write seek control by transmitting an amount of a control operation corresponding to the difference in the velocity between velocity indicated with target velocity data for controlling the write seek selected from the memory means and movement velocity obtained in accordance with the position of the head detected by the detecting means;

driving means for moving the head to the target position at the velocity determined in accordance with the amount of the control operation transmitted from the read seek control means or the write seek control means; and memory means stores target velocity data for controlling the read seek and the write seek indicating velocity characteristics with which movement of the head is controlled, which have the same target velocity for use in an acceleration mode and a constant velocity mode and which have different target velocity for use in a deceleration mode in which the head approaches the target position.

7. In a disk drive having a head, a disk and a head positioning control system for positioning the head in a target position on the disk based on a servo data prerecorded on the disk, the head positioning control system comprising:

determining means for determining read seek control for moving the head to the target position when a read access is made to read data by the head from the target position on the disk or write seek control for moving the head to the target position when a write access is made to write data on the target position;

detecting means for detecting the position of the head in accordance with servo data read by the head;

memory means for previously storing target velocity data for controlling the read seek and target velocity data for controlling the write seek;

means for selectively reading target velocity data for controlling the read seek from the memory means when the read seek control is performed and for selectively reading target velocity data for controlling the write seek from the memory means when the write seek control is performed;

read seek control means for executing the read seek control by transmitting an amount of a control operation corresponding to the difference in the velocity between velocity indicated by target velocity data for controlling the read seek selected from the memory means and movement velocity obtained in accordance with the position of the head detected by the detecting means;

write seek control means for executing the write seek control by transmitting an amount of a control operation corresponding to the difference in the velocity between velocity indicated with target velocity data for controlling the write seek selected from the memory means and movement velocity obtained in accordance with the position of the head detected by the detecting means;

driving means for moving the head to the target position at the velocity determined in accordance with the amount of the control operation transmitted from the read seek control means or the write seek control means;

read control means includes means for executing read position control after the head has approached the target position by using target position locus data having a high velocity characteristic to position the head in an allowable range for the target position; and the write seek control means includes means for executing write position control after the head has approached the target position by using target position locus data having a precise accuracy characteristic to position the head in a relatively narrow allowable range for the target position as compared with the allowable range for use when the read access is made.

8. In a disk drive having a head, a disk and a head positioning control system for positioning the head in a target position on the disk based on a servo data prerecorded on the disk, the head positioning control system comprising:

determining means for determining read seek control for moving the head to the target position when a read access is made to read data by the head from the target position on the disk or write seek control for moving the head to the target position when a write access is made to write data on the target position;

detecting means for detecting the position of the head in accordance with servo data read by the head;

memory means for previously storing target velocity data for controlling the read seek and target velocity data for controlling the write seek;

means for selectively reading target velocity data for controlling the read seek from the memory means when the read seek control is performed and for selectively reading target velocity data for controlling the write seek from the memory means when the write seek control is performed;

read seek control means for executing the read seek control by transmitting an amount of a control operation corresponding to the difference in the velocity between velocity indicated by target velocity data for controlling the read seek selected from the memory means and movement velocity obtained in accordance with the position of the head detected by the detecting means;

write seek control means for executing the write seek control by transmitting an amount of a control operation corresponding to the difference in the velocity between velocity indicated with target velocity data for controlling the write seek selected from the memory means and movement velocity obtained in accordance with the position of the head detected by the detecting means;

driving means for moving the head to the target position at the velocity determined in accordance with the amount of the control operation transmitted from the read seek control means or the write seek control means;

each of target velocity data items for respectively controlling the read seek and the write seek has a velocity characteristic composed of an acceleration mode, a constant speed mode and a deceleration mode; and target velocity data for controlling the write seek is arranged in such a manner that start time of the deceleration mode is earlier than start time of the deceleration mode indicated by target velocity data for controlling the read seek.

* * * * *